United States Patent [19]

Mukamal et al.

[11] 4,400,485

[45] Aug. 23, 1983

[54] RUBBER COMPOSITION

[75] Inventors: Harold Mukamal, Seal Beach, Calif.; Richard S. Lamar, Littletown, Colo.; Laurence E. Ferreira, Pacific Palisades, Calif.

[73] Assignee: Standard Oil Company (Indiana), Chicago, Ill.

[21] Appl. No.: 297,175

[22] Filed: Aug. 28, 1981

[51] Int. Cl.³ .............................................. C08K 3/34
[52] U.S. Cl. .................................. 524/444; 523/203; 523/213; 523/216; 524/445; 524/447; 524/448; 524/449; 524/450; 524/451; 524/493; 428/405; 525/342; 525/380; 260/756
[58] Field of Search .................. 523/203, 213, 215; 524/444, 449, 451, 450, 445, 447, 448, 493; 428/405; 260/756, 760; 525/342, 380

[56] References Cited

U.S. PATENT DOCUMENTS

| 3,290,165 | 12/1966 | Iannicelli | 523/213 |
| 3,350,345 | 10/1967 | Vanderbilt et al. | 523/213 |
| 3,649,320 | 3/1972 | Yates | 523/213 |
| 3,737,334 | 6/1973 | Doran et al. | 523/203 |
| 3,862,259 | 1/1975 | Russelt et al. | 523/203 |
| 3,953,223 | 4/1976 | Doran et al. | 523/211 |
| 4,143,027 | 3/1979 | Sollman et al. | 523/211 |
| 4,156,677 | 5/1979 | Williams et al. | 523/213 |
| 4,233,366 | 11/1980 | Sample et al. | 428/405 |

FOREIGN PATENT DOCUMENTS

| 136848 | 8/1979 | German Democratic Rep. | 523/213 |
| 52-33931 | 3/1977 | Japan | 523/216 |
| 53-115769 | 10/1978 | Japan | 523/342 |
| 1236901 | 6/1975 | United Kingdom | 525/342 |

OTHER PUBLICATIONS

Derwent Abs., 07636 W/05, AKAD (DD 1694008) 1-23-75.
Derwent Abs., 25415 A/14, AKAD (DD 129548) 1-2-5-78.
Derwent Abs., 47068 C/27, Japan Synt. Rubber (JS 5066937), 5-80.

*Primary Examiner*—Paul Lieberman
*Assistant Examiner*—Herbert J. Lilling
*Attorney, Agent, or Firm*—James R. Henes; William T. McClain; William H. Magidson

[57] ABSTRACT

A rubber composition containing a phyllosilicate mineral filler is disclosed.

48 Claims, 4 Drawing Figures

RUBBER COMPOSITION

BACKGROUND OF THE INVENTION

This invention relates generally to a rubber composition and more particularly concerns a rubber composition containing a phyllosilicate mineral filler.

The precise formulation of any elastomeric compound depends on its intended end use. Different end uses require very specific mechanical properties. To a degree, the choice of filler and agent for coupling the elastomer and filler determines the mechanical properties of the elastomeric compound. For example, the use of organosilane coupling agents generally of formula I shown hereinbelow, in conjunction with phyllosilicate minerals as extending or reinforcing fillers in natural or synthetic elastomer compositions, is well known in the art—especially as represented by Sample et al., U.S. Pat. No. 4,260,498, which in its entirety is specifically incorporated herein by reference. Alexander et al., U.S. Pat. No. 2,801,186 and Doran et al., U.S. Pat. No. 3,737,334 also contain illustrative disclosures. In such cases, the organosilane serves to improve the overall mechanical properties of the rubber compositions. In use, the functional organic groups hydrolyze in the presence of moisture typically found on the surface of the minerals to form silanols which react with or otherwise condense in the presence of silica, clay or metal oxide surfaces. To be effective in this respect, the silane coupling agent must be reactive with both the polymer and filler. The coupling agent may be applied to the filler in a separate pre-treatment step, or it may be added directly during elastomer compounding.

Amines have also been disclosed generally for use with phyllosilicate mineral fillers or pigments. Hall, U.S. Pat. No. 2,713,572; Lundsteb, U.S. Pat. No. 2,979,528; Dohman et al., U.S. Pat. No. 3,298,849; Brockmann et al., U.S. Pat. No. 3,925,095; Russell et al., U.S. Pat. No. 3,994,742; Chuiko et al., U.S. Pat. No. 4,121,946; and Compton, U.S. Pat. No. 4,137,092, contain illustrative disclosures. In particular, N,N,N',N'-tetra-2-hydroxypropyl-ethylenediamine, marketed as Quadrol by Wyandotte Chemical Co., and N,N,N',N'-tetra-(2-hydroxybutyl)-ethylenediamine and N,N,N',N'',N''',N'''',N''''-hepta-(2-hydroxybutyl)-tetraethylenepentamine, designated as Nalco L-1718 and Nalco L-1782, respectively, by Nalco Chemical Co., have been disclosed as specific additives for use with talc fillers to develop with highest degree of reinforcement in rubber compositions.

Thus, the use of a phyllosilicate mineral filler in conjunction with either an organosilane or a polyhydroxylated polyamine has been disclosed for use in rubber compositions. However, the use of a phyllosilicate mineral filler in conjunction with both an organosilane and an amine has not heretofore been disclosed for use in rubber compositions. Furthermore, in spite of the known efficacy of organosilanes or amines in rubber compositions, efforts continue to discover alternatives or improvements to known organosilanes and amines. A problem of using such additives as organosilanes or amines in rubber compositions is their relatively high cost. It is therefore desirable to reduce the amount of such agents in rubber compositions without also reducing their effect on the mechanical properties of the rubber compositions.

OBJECTS OF THE INVENTION

Accordingly, it is a general object to provide a rubber composition containing a phyllosilicate mineral filler and an additive package wherein the effect of the additive package on the mechanical properties of the composition is maximized and the amount of each component of the additive package is minimized.

More particularly, it is an object of this invention to provide a rubber composition containing a synergistic combination of additives whose combined effect on the mechanical properties of the rubber composition is greater than the sum of the effects of each additive alone on such properties.

Other objects and advantages of the invention will become apparent upon reading the following detailed description and appended claims.

SUMMARY OF THE INVENTION

The present invention is a rubber composition formed according to an improved rubber compounding process. The improvement comprises vulcanizing natural or synthetic rubber containing a substantially uniform dispersion of A, B, C, or D. A comprises (1) a particulate Agent E at a level of from about 5 to about 200 pounds per hundred pounds of rubber (phr), (2) Agent F at a level of from about 0.005 to about 15 phr, and (3) Agent G at a level of from about 0.005 to about 15 phr. B comprises (1) a particulate adduct of Agents E and F having a median particle size in the range of from about 0.01 to about 20 microns and present at a level such that the portion thereof contributed from Agent E is at a level of from about 5 to about 200 phr and the portion thereof contributed from Agent F is at a level of from about 0.005 to about 15 phr, and (2) Agent G at a level of from about 0.005 to about 15 phr. C comprises (1) a particulate adduct of Agents E and G having a median particle size in the range of from about 0.01 to about 20 microns and present at a level such that the portion thereof contributed from Agent E is at a level of from about 5 to about 200 phr and the portion thereof contributed from Agent G is at a level of from about 0.005 to about 15 phr, and (2) Agent F at a level of from about 0.005 to about 15 phr. D comprises a particulate adduct of Agents E, F, and G having a median particle size in the range of from about 0.01 to about 20 microns and present at a level such that the portion thereof contributed from Agent E is at a level of from 5 to about 200 phr, the portion thereof contributed from Agent F is at a level of from about 0.005 to about 15 phr and the portion thereof contributed from Agent G is at a level of from about 0.005 to about 15 phr.

In this context, Agent E comprises phyllosilicate mineral particles having a median particle size in the range of from about 0.01 to about 20 microns. Agent F comprises an organosilane of formula I.

In formula I, X is a group which is, or which upon hydrolysis forms a group which is, capable of reacting with a reactive site on the phyllosilicate mineral particles so as to form a bond between the organosilane of formula I and the phyllosilicate mineral particles, Y is an alkyl, aryl, or alkyl-substituted aryl group containing from 1 to 20 carbon atoms and bears a functional group capable of reacting with a reactive site on the rubber so as to form a bond between the organosilane of formula I and the rubber, and $R_1$ and $R_2$ are the same or different and are each selected from the group consisting of the groups described by X and Y, an alkyl group containing from 1 to 20 carbon atoms, an aryl group, and an alkyl-substituted aryl group wherein the alkyl substituents contain a total of from 1 to 20 carbon atoms.

Agent G comprises an amine of formula II.

In formula II, Z is zero or a positive integer from 1 to 12. $R_3$, $R_4$, $R_6$ and $R_7$ are the same or different and are each selected from the group consisting of hydrogen, an alkyl group containing from 1 to 20 carbon atoms, an aryl group and an alkyl-substituted aryl group wherein the alkyl substituents contain a total of from 1 to 20 carbon atoms. $R_5$ is an alkylene group containing from 2 to 16 carbon atoms. When Z is zero, at least one of $R_3$, $R_4$, and $R_7$ bears a first functional group which is capable of reacting with a reactive site on the rubber so as to form a bond between the amine of formula II and the rubber, and at least one of $R_3$, $R_4$, and $R_7$ bears a second functional group which is, or which upon hydrolysis forms a group which is, capable of reacting with a reactive site on the phyllosilicate mineral particles so as to form a bond between the amine of formula II and the phyllosilicate mineral particles and which second functional group is located at a carbon atom which is beta, or gamma to the nearest nitrogen atom in formula II. When Z is not zero, at least one of $R_3$, $R_4$, $R_6$, and $R_7$ bears a first functional group which is capable of reacting with a reactive site on the rubber so as to form a bond between the amine of formula II and the rubber and, in addition, when $R_5$ contains more than 3 carbon atoms, at least one of $R_3$, $R_4$, $R_6$, and $R_7$ bears a second functional group which is, or which upon hydrolysis forms a group which is, capable of reacting with a reactive site on the phyllosilicate mineral particles so as to form a bond between the amine of formula II and the phyllosilicate mineral particles and which second functional group is located at a carbon atom which is beta or gamma to the nearest tertiary nitrogen atom in formula II.

The present invention is also a rubber composition comprising phyllosilicate mineral particles substantially uniformly distributed in natural or synthetic rubber at a level of from about 5 to about 200 phr and having a median particle size of from about 0.01 to about 20 microns, with (1) an Adduct A of the rubber and phyllosilicate mineral particles with an organosilane of the aforesaid formula I and (2) an Adduct B of the rubber and phyllosilicate mineral particles with an amine of the aforesaid formula II. In this context, the portion of Adduct A contributed from the organosilane of formula I is at a level of from about 0.005 to about 15 phr, and the portion of Adduct B contributed from the amine of formula II is at a level of from about 0.005 to about 15 phr.

BRIEF DESCRIPTION OF THE DRAWINGS

For a more complete understanding of this invention, reference should now be made to the accompanying drawings and to the embodiments described below by way of examples of the invention. In the drawings.

It should be understood, of course, that the invention is not intended to be limited to the particular embodiments to which FIGS. 1–4 pertain.

DETAILED DESCRIPTION

According to the present invention, the aforesaid organosilane of formula I and amine of formula II can be employed in any convenient, conventional rubber compounding process to form the rubber composition of this invention. While any of the conventional curing agents known to the art can be employed in the method of this invention, typical curing agents include sulfur or sulfur-donating materials (in combination with suitable accelerators) and peroxide and other free radical producing agents. Preferably sulfur or a sulfur-donating material is employed.

In the composition of the present invention, the rubber can suitably be natural rubber or a synthetic rubber such as polybutadiene rubber, polyisoprene rubber, styrene-butadiene rubber, nitrile rubber, butyl rubber, ethylene-propylene rubber, polyacrylate rubber, silicone rubber, chlorosulfonated polyethylene polymer rubber, epichlorohydrin rubber, fluoroelastomer rubber or polyurethane rubber. Preferably, the rubber is natural rubber, polybutadiene rubber, polyisoprene rubber or styrene-butadiene rubber.

The mineral filler employed in the composition of the present invention is a phyllosilicate mineral. As a general proposition, the silicates can be broadly divided into four groups according to crystal structure. The first group is made up of massive silicates with bonds more or less equally strong in three dimensions, giving rise to isodimensional particles. The second group is made up of lamellar or layer-type silicates (the phyllosilicates) in which the bonds are strong in two dimensions but relatively weak in the third, giving rise to layer-like structures. The third group is made up of needle-like or acicular-type silicates in which the bonds are predominantly strong in one dimension but relatively weak in the other two. The fourth group is made up of those silicates in which the crystal structure is so little developed that they may be classified as amorphous.

The composition of this invention concerns the aforesaid second group made up of lamellar phyllosilicate minerals. The phyllosilicates comprise the class of silicate minerals in which the silicon-oxygen tetrahedral groups are linked by sharing three oxygens of each tetrahedron with other tetrahedra so as to form sheets of indefinite extent, in which the ratio of silicon to oxygen is 2:5. Phyllosilicate minerals generally comprise a multiplicity of individual sheets, each having a particular crystalline structure where each of the sheets or layers is weakly attached to adjacent sheets by electrostatic attraction, Van Der Waals forces or hydrogen bonding involving four out of six hydroxyl groups per unit cell of the crystalline structure.

The numerous phyllosilicate minerals can be grouped into seven different subclasses. The first subclass is characterized by a two-layer structure and is made up of the kaolin group (kaolinite, dickite, nacrite, metahalloysite, halloysite, allophane and anauxite) and the septechlorite group (serpentine, chrysotile, antigorite, picrolite, lizardite, garnierite, pecoraite, greenalite, berthierite, bementite, amesite, grovesite and cronstedtite). The second subclass is characterized by primitive three-layer structures and comprises pyrophyllite, talc, minnesotaite and willemseite. The third subclass is made up of the micas (leucophyllite, celadonite, glauconite, phengite, alurgite, mariposite, illite, brammallite, hydromuscovite, muscovite, paragonite, roscoelite, fuchsite, ollacherite, sericite, taeniolite, polylithionite, lepidolite, zinnwaldite, manganophyllite, hendricksite, biotite, phlogopite, siderophyllite, annite, and lepidomelane). The fourth subclass is made up of the brittle micas (margarite, bityite, ephesite, xanthophyllite, clintonite and anandite). The fifth subclass is characterized by expandable three-layer structures and is made up of the smectites (montmorillonite, beidellite, nontronite, volchonskoite, hectorite, saponite, stevensite, sauconite, and pimelite) and vermiculite. The sixth subclass is characterized by four-layer structures and is made up of chlorite, thuringite, ehamosite, rpiidolite, brunsvigite, diabandite, sheridanite, clinochlore, penninite, ferrian, chromian, kammererite, manganian, pennantite, gonyerite, nimite and cookeite. The seventh subclass is made up of other layer structures also known as pseudolayer silicates and is made up of apophyllite, sanbornite, gillespite, cuprorivaite, palygorskite, sepiolite, prehnite, stilpnomelane, fenaksite, chrysocolla, krauskopfite, okenite, nekoite, stillwellite, ekanite, the melilite group (gehlenite, akermanite and hardystonite), leucophanite, meliphanite, datolite, gadolinite, homilite, leucosphenite, dalyite, astrophyllite, kupletskite, and niobophyllite.

In the composition of the present invention, the phyllosilicate preferably is a member of the kaolin group, a member of the mica group, a member of the group characterized by a primitive three-layer structure, a member of the group characterized by an expandable three-layer structure or a member of the group characterized by a four-layer structure, more preferably is kaolinite, muscovite, pyrophyllite, talc, vermiculite or chlorite and most preferably is talc.

The median particle size of the phyllosilicate mineral particles in the rubber composition of this invention, and of the phyllosilicate mineral particles introduced in the preparation of the rubber composition of this invention, is in the range of from about 0.01 micron, preferably from about 0.1 micron, to about 20 microns, preferably to about 1 micron. If the phyllosilicate mineral particles are introduced in the preparation of the rubber composition of this invention in the form of their adducts with at least one of the agents of formula I and formula II, the median particle size of the adducts is in the range of from about 0.01 micron, preferably from about 0.1 micron to about 20 microns, preferably to about 1 micron. In the present context, the median particle size is determined from a plot of the weight percent of particles having equivalent spherical diameters smaller than a particular equivalent spherical diameter versus equivalent spherical diameter, and is defined as the equivalent spherical diameter below which 50 weight percent of the particles have their equivalent spherical diameter.

The phyllosilicate mineral particles in the composition of this invention are at a level of from about 5 phr, preferably from about 50 phr, to about 200 phr, preferably to about 150 phr. If introduced directly in the preparation of the rubber composition of this invention, the mineral particles are introduced at the same aforesaid level and aforesaid preferred level. If introduced in the preparation of the rubber composition of this invention in the form of one of its aforesaid adducts with at least one of the agents of formula I and of formula II, the adducts are introduced at a level such that the portion of each adduct contributed from the phyllosilicate mineral particles is introduced at a level of from about 5 phr, preferably from about 50 phr, to about 200 phr, preferably to about 150 phr.

In formula I, preferably X is a group which upon hydrolysis forms a hydroxy group. More preferably X is selected from the group consisting of a halogen radical and —$OR_8$ and wherein $R_8$ is an alkyl group containing from 1 to 20 carbon atoms. $R_8O$— can include ether and amine linkages and thus can be 2-methoxyethoxy and 2-(methylamino)-ethoxy and similar radicals. Most preferably, X is —$OR_8$, and $R_8$ contains from 1 to 7 carbon atoms. The aryl group in $R_1$, $R_2$ and Y is preferably a phenyl group.

Preferably the functional group on Y which is capable of reacting with a reactive site on the rubber is selected from the group consisting of a mercapto group, an allyl group, a vinyl group, an epoxy group, a methacryloxy group, an acryloxy group, and an amino group containing an active hydrogen atom. More preferably, Y contains a mercapto group, a vinyl group or an amino group having an active hydrogen atom and most preferably, Y contains from 1 to 6 carbon atoms.

Preferably, $R_1$ and $R_2$ are the same or different and are each selected from the group consisting of the group described by X. More preferably, $R_1$ and $R_2$ are the same or different and are each selected from the group consisting of a halogen radical and —$OR_8$ and wherein $R_8$ is an alkyl group containing from 1 to 20 carbon atoms and can include ether and amine linkages as described above. Most preferably, X is —$OR_8$ and $R_8$ contains from 1 to 7 carbon atoms.

Preferably X, $R_1$ and $R_2$ are the same.

Organosilanes generally described by formula I are disclosed in the prior art, and are either available commercially or can be prepared by standard methods of forming organosilanes. Suitable specific organosilanes of formula I include ethylvinyltrichlorosilane, vinyltriethoxysilane, vinyl-tri(2-methoxyethoxy) silane, 3-methacryloxypropyl-trimethoxysilane, 2-(3,4-epoxycyclohexyl) ethyltrimethoxysilane, 3-glycidroxypropyl-trimethoxysilane, vinyltriacetoxysilane, 3-mercaptopropyltrimethoxysilane, 3-aminopropyltriethoxysilane, N-(2-aminooctyl)-3-aminopropyl-trimethoxysilane, and bis-(triethoxysilylpropyl) tetrasulfide. Preferred organosilanes of formula I are 3-aminopropyltriethoxysilane, 3-mercaptopropyl-trimethoxysilane and vinyl-tri-(2-methoxyethoxy) silane.

In the rubber composition of this invention, the adduct of the rubber and phyllosilicate mineral particles with the organosilane of formula I is at a level such that the portion thereof contributed from the organosilane is at a level of from about 0.005 phr, preferably from about 0.25 phr, to about 15 phr, preferably to about 3 phr. If introduced directly in the preparation of the rubber composition of this invention, the organosilane of formula I is introduced at a level in the range of from about 0.05 phr, preferably from about 0.25 phr, to about 15 phr, preferably to about 3 phr. If the organosilane of formula I is introduced in the preparation of the rubber composition of this invention in the form of one of its aforesaid adducts with at least one of the phyllosilicate mineral particles and the amine of formula II, such adduct is introduced at a level such that the portion of the adduct contributed from the organosilane is introduced at a level of from about 0.05 phr, preferably from about 0.25 phr, to about 15 phr, preferably to about 3 phr.

In formula II, when $Z$ is zero, preferably the aforesaid first functional group on at least one of $R_3$, $R_4$, and $R_7$ is selected from the group consisting of a mercapto group, alkyl group, vinyl group, epoxy group, methacryloxy group, acryloxy group, hydroxy group, a group hydrolyzable to a hydroxy group, and an amino group having an active hydrogen atom, and the aforesaid second functional group on at least one of $R_3$, $R_4$ and $R_7$ is selected from the group consisting of a hydroxy group, an alkoxy group, an amino group, a mercapto group, and a sulfide group. Preferably the alkoxy group is $-OR_8$ as defined above.

Preferably, when $Z$ is not zero, the aforesaid first functional group on at least one of $R_3$, $R_4$, $R_6$ and $R_7$ is selected from the group consisting of a mercapto group, allyl group, vinyl group, epoxy group, methacryloxy group, acryloxy group, hydroxy group, a group hydrolyzable to a hydroxy group, and an amino group having an active hydrogen atom, and in addition, when $R_5$ contains more than three carbon atoms, the aforesaid second functional group on at least one of $R_3$, $R_4$, $R_6$ and $R_7$ is selected from the group consisting of a hydroxy group, an alkoxy group, an amino group, a mercapto group, and a sulfide group. Most preferably, when $Z$ is not zero, at least one of $R_3$, $R_4$, $R_6$, and $R_7$ bears one of the aforesaid second functional groups, regardless of whether or not $R_5$ contains more than three carbon atoms.

Preferably, in formula II, $Z$ is zero or 1. It is also preferred that $R_5$ contains from 2 to 3 carbon atoms. The aryl group in $R_3$, $R_4$, $R_6$ or $R_7$ is preferably a phenyl group.

Amines generally described by formula II are disclosed in the prior art, and are either available commercially or can be prepared by standard methods of forming amines. Suitable specific amines of formula II include triethanolamine, tri-(2-hydroxypropyl)-amine, tri(polyethyleneoxide)-amine, tri(polypropyleneoxide)-amine, N,N,N',N'-tetra(2-hydroxyethyl)-ethylenediamine, N,N,N',N'-tetra(3-aminopropyl)-ethylenediamine, N,N,N',N'-tetra(2-mercaptobutyl)-ethylenediamine, N,N,N',N'-tetra(polyethyleneoxide-6-polypropyleneoxide)-ethylenediamine, N,N,N',N'',N''-penta(2-hydroxyethyl)-diethylenetriamine, and N,N,N',N'',N'''N'''-hexa(2-hydroxyethyl)-triethylenetetraamine. Preferably, the amine of formula II is triethanolamine and N,N,N',N'-tetra(2-hydroxypropyl) ethylenediamine.

In the rubber composition of this invention, the adduct of the rubber and phyllosilicate mineral particles with the amine of formula II is at a level such that the portion thereof contributed from the amine is at a level of from about 0.005 phr, preferably from about 0.25 phr, to about 15 phr, preferably to about 3 phr. If introduced directly in the preparation of the rubber composition of this invention, the amine of formula II is introduced at a level in the range of from about 0.005 phr, preferably from about 0.25 phr, to about 15 phr, preferably to about 3 phr. If the amine of formula II is introduced in the preparation of the rubber composition of this invention in the form of one of its aforesaid adducts with at least one of the phyllosilicate mineral particles and the organosilane of formula I, such adduct is introduced at a level such that the portion of the adduct contributed from the amine is introduced at a level of from about 0.005 phr, preferably from about 0.25 phr, to about 15 phr, preferably to about 3 phr.

While not intending to limit the scope of this invention or to be bound in any way by the following proposed explanation, it is believed that the amine of formula II attaches to the phyllosilicate mineral particles by virtue of a chelate formed between the amine and metal ions in the phyllosilicate mineral particles. The quantitativeness or completeness of chelation is governed by the stability of the chelate formed, which in turn is favored by the formation of a polydentate complex. The enhanced stability of chelates arises from the formation of a ring structure, compared with a similar complex involving no ring formation. The chelate effect is most pronounced if a five-membered ring or a six-membered ring is formed with the metal ion of the phyllosilicate mineral.

Thus, in the amine of formula II, when $Z$ is zero, the tertiary nitrogen atom shown in formula II acts as an electron-pair donor and attaches to a metal ion in the phyllosilicate mineral. In such case, an aforesaid second functional group, such as a hydroxy group, must be present in at least one group attached to the tertiary nitrogen atom in order to attach to the metal ion and thereby form a five- or six-membered ring including the nitrogen atom, the metal ion and the second functional group. Furthermore, in order for a five- or six-membered ring to be formed, the second functional group must be attached to a carbon atom which is beta or gamma to the tertiary nitrogen atom.

When $Z$ is not zero, if $R_5$ contains two or three carbon atoms, then a chelate could also be formed by reaction of a metal ion of the phyllosilicate mineral with the two closest tertiary nitrogen atoms. In such case, an aforesaid second functional group is not necessary in order to form a chelate with a metal ion of the phyllosilicate mineral. However, if $R_5$ contains more than three carbon atoms, then a stable chelate including the two closest tertiary nitrogen atoms of the amine and a metal ion of the phyllosilicate mineral is very unlikely. In this case, an aforesaid second functional group attached to a carbon atom which is beta or gamma to one of the tertiary nitrogen atoms must be present.

In any event, the chelate effect becomes more pronounced as the number of chelate rings per ligand—that is, the amine molecule—increases. For example, N,N,N',N'-tetra-(2-hydroxypropyl)-ethylenediamine may act as a hexadentate ligand, occupying six coordination positions. Consequently, regardless of the value of Z or length of the $R_5$ chain, the chelate effect is more pronounced when, and hence it is preferred that, at least one second functional group is present in $R_3$, $R_4$, $R_6$ or $R_7$, and it is more preferred that more second functional groups are present in $R_3$, $R_4$, $R_6$ and $R_7$.

When Z is zero or $R_5$ contains more than 3 carbon atoms, that both aforesaid first and second functional groups must be present on the amine of formula II is evident from the failure to obtain a synergistic improvement of the mechanical properties of a rubber composition when an amine is employed which does not contain both aforesaid first and second functional groups. For example, when used in conjunction with an organosilane of formula I in a rubber composition, N,N-diethyl-N-(2-hydroxyethyl)-amine does not afford a synergistic improvement in the mechanical properties of the rubber composition. In N,N-diethyl-N-(2-hydroxyethyl) amine, Z is zero and the hydroxy group can function as either an aforesaid first functional group or an aforesaid second functional group. However, since only one hydroxy group is present, it can serve only as a first functional or as a second functional group, but not simultaneously as both. Similarly even when Z is not zero and $R_5$ contains only 1 or 2 carbon atoms, unless at least one of the aforesaid first functional groups is attached to a carbon atom which is beta or gamma to one of the tertiary nitrogen atoms, a synergistic improvement in the mechanical properties of the rubber composition is not obtained. Thus N,N,N',N'-tetraethyl-ethylenediamine in combination with an organosilane of formula I in a rubber composition does not afford a synergistic improvement in the mechanical properties of the rubber composition. In N,N,N',N'-tetraethyl-ethylenediamine, Z is 1 and $R_5$ contains 2 carbon atoms and the two tertiary nitrogen atoms are close enough to form a stable chelate with a metal ion of the phyllosilicate mineral. However, N,N,N',N'-tetraethyl-ethylenediamine does not contain an aforesaid first functional group and hence cannot attach itself to the rubber.

Preparation of the rubber compositions of this invention is conventional except for the addition of the organosilane of formula I and amine of formula II. Any conventional vulcanization method which can accommodate the introduction of the organosilane and amine can be employed. Whether the phyllosilicate mineral particles, organosilane and amine are introduced in the vulcanization process simultaneously or at different stages or whether as separate components or in the form of their various adducts as described hereinabove is primarily a matter of convenience.

In one suitable method of preparation, a batch of natural or synthetic rubber is initially mixed in a conventional roll mill or internal mixer such as a Banbury mixer. As mixing proceeds, the temperature of the rubber increases. When the temperature reaches a temperature in the range of from about 40° C. to about 60° C., a metallic oxide, typically zinc oxide, at a level of from about 1 to about 10 phr, a fatty acid, typically stearic acid, at a level of from about 0.5 to about 5 phr and an antioxidant, typically butylated p-phenylphenol, at a level of from about 0.5 to about 5 phr are introduced into the rubber during mixing. In the alternative, the oxide, fatty acid and antioxidant can be introduced initially with the rubber.

Mixing is then continued until the temperature of the mixture increases to a temperature in the range of from about 70° C. to about 80° C., at which point a softening agent such as process oil, and the particulate phyllosilicate mineral filler, organosilane and amine are added.

Mixing is continued until the temperature of the mixture reaches about 80° C. to about 90° C. At this point the curing agent(s) is (are) added at a level of from about 1 to about 10 phr, and mixing is continued until the temperature reaches about 110° C. or for about a minute, whichever is shorter. Typical curing agents include sulfur and sulfur-donating materials (in combination with suitable accelerators commonly known in the art) and peroxides and other free radical producing systems.

The resulting mixture is then removed from the Banbury mixer and formed into a predetermined shape, for example, sheets. After storing overnight at room temperature, the shaped mixture is cured by pressure molding at 160° C. for about 12 minutes.

In the alternative, a particulate adduct of the phyllosilicate mineral particles and the organosilane of formula I and/or amine of formula II may be formed in a separate pretreatment step, and the adduct, instead of the separate components from which the adduct is made, is introduced into the rubber in the above procedure. For example, one particulate adduct of the phyllosilicate mineral particles and the organosilane of formula I and/or the amine of formula II is prepared by agitating the phyllosilicate mineral particles in a Littleford Brothers Model KM 130 Mixer. Heat is generated in the agitation process. Then the other component(s) of the adduct to be made is (are) sprayed through a nozzle into the agitated phyllosilicate mineral particles, and the resulting mixture is stirred for about 15 minutes and is thereafter removed from the mixer and dried at 100° C.

The following examples describe in detail compositions and methods illustrative of the present invention. It will be apparent to those skilled in the art that many modifications, both of materials and methods, may be practiced without departing from the purpose and intent of this disclosure.

EXAMPLES 1-17

A batch of 100 parts by weight of rubber, 5 parts by weight of zinc oxide, 1 part by weight of stearic acid and 1 part by weight of 2,2-methylene-bis-(4-methyl-6-t-butylphenol) of American Cyanamid was introduced into a water-cooled BR Banbury internal mixer having two rolls and an air activated ram. The rotor speed of the mixer was set at 125 rpm and the water and air pressure to the mixer were set at 20 and 15 pounds per square inch, respectively. The mixer was allowed to run for about 30 seconds, until the temperature of the mixture reached 66° C., at which point mixing was stopped and 75 parts by weight of talc (Cyprus Industrial Minerals Mistron Vapor ®) having a median particle size of about 1.8 microns and a specific surface area of about 16 square meters per gram and 10 parts by weight of light process oil (Witco's Cyclolube NN-2) were added to the mixture. Mixing was continued until the temperature of the mixture reached 82° C., whereupon mixing was stopped temporarily while any loose powder was removed from the ram. Mixing was again continued until the temperature reached 93° C., at which point mixing was stopped to permit loose powder to again be removed from the ram, and 3 parts by weight of sulfur and 0.75 part by weight of a mercapto-benzothiazole disulfide accelerator (R. T. Vanderbilt's Altax) were added. Further mixing to a temperature of 104° C. was followed by stopping mixing and removing loose powder from the ram. Mixing was resumed until the temperature of the mixture reached 116° C. At this point the mixture was removed from the Banbury mixer.

The mixture was then formed into sheets in a 2-roll mill set to a thickness of 3/16-inch. The resulting sheets were cooled and stored at room temperature overnight. Prior to vulcanization, the sheets were remilled in the 2-roll mill. The remilled sheets were vulcanized at 160° C. using a compression molding technique. The vulcanized sheets were then tested by standard methods to determine their rheometric, static, dynamic, tear, hardness, rebound, compression and flex fatigue properties, as described hereinbelow.

In each of Examples 1–17, styrene-butadiene synthetic rubber was employed. Styrene-butadiene type 1502 was employed in Examples 1–13, and styrene-butadiene type 1500 was employed in Examples 14–17. The organosilane employed was 3-aminopropyltriethoxysilane in Examples 1–5 and 14–17 and 3-mercaptopropyltrimethoxysilane in Examples 9–11. The amine employed was N,N,N',N'-tetra-(2-hydroxypropyl)-ethylenediamine in Examples 3–7, 14, 16 and 17 and triethanolamine in Examples 11–13. The amounts of the organosilanes and amines employed in Examples 1–17 are indicated in Table I, in units of pounds per hundred pounds of rubber (phr).

The rheometric data were obtained using ASTM test D-2084-75 with a 1° amplitude of oscillation of the test disk about its center position and at 320° F. and are presented in Table II. $M_L$ and $M_H$ represent the minimum torque and maximum torque, respectively. $T_{S2}$ represents the time to 2 units of torque increase above the minimum and is accepted as the scorch time. $T_c(10)$ and $T_c(90)$ represent the times to 10 and 90 percent, respectively, of full torque development, and $T_c(90)$ is accepted as the cure time.

The static properties were measured in accordance with ASTM test D-412-75-Method A, and the test results are presented in Table III. $E_u$ and $T_u$ represent the ultimate elongation and ultimate tensile strength, respectively. $T_{100}$, $T_{200}$, $T_{300}$ and $T_{400}$ represent the tensile strength at 100, 200, 300 and 400 percent elongation, respectively.

The dynamic properties were measured using a Dynastat Viscoelastic Analyzer marketed by Imass, Inc. of Accord, Mass. The test samples were each in the shape of a cylindrical button of 0.5-inch diameter and 0.375-inch height. The results are presented in Table IV. The reported results were obtained at a frequency of 10 Hertz and at room temperature. M' represents the storage or elastic modulus, and M" represents the viscous or loss modulus. M' and M" are denoted and measured as E' and E" on the Dynastat Analyzer. Tan Delta is the quotient obtained by dividing M" by M'. Tan Delta is a property which is indicative of heat build up with high frequency flexing and is an important characteristic in compositions for use as tire side wall and tread stock. These dynamic properties can also be measured by numerous other techniques known in the art.

The tear resistance properties were measured by ASTM test D624-73-Die C Method and are reported in Table V. Also reported in Table V are values for the Shore A Hardness, Rebound D, compression set and fatigue. Shore A Hardness was measured using ASTM test D-2240-75. Rebound D was measured using ASTM test D-2632. Compression set was measured using ASTM test D-395-69-Method B heating at 100° C. for 70 hours. Fatigue was measured using the Monsanto Fatigue To Failure Tester and method.

The results presented in Tables II–V indicate that, as a result of the use of the combination of organosilane of formula I and amine of formula II in the composition of this invention, certain properties of rubber compositions are unaffected while others are even adversely affected. Nevertheless, a synergistic improvement in such properties as $T_{100}$, $T_{200}$, $T_{300}$, $T_{400}$, M', M" and Tan Delta is observed.

TABLE I

| Example No. | Concentration (phr) of | |
|---|---|---|
| | Silane | Amine |
| 1 | 1.5 | 0 |
| 2 | .75 | 0 |
| 3 | .75 | 1 |
| 4 | .38 | 1 |
| 5 | .38 | 2 |
| 6 | 0 | 2 |
| 7 | 0 | 1 |
| 8 | 0 | 0 |
| 9 | 1.5 | 0 |
| 10 | .75 | 0 |
| 11 | .75 | 1 |
| 12 | 0 | 2 |
| 13 | 0 | 1 |
| 14 | 0 | 3 |
| 15 | .75 | 0 |
| 16 | .75 | 1 |
| 17 | .75 | 3 |

TABLE II

| Example No. | Rheometric Properties | | | | |
|---|---|---|---|---|---|
| | $M_L$(lbs.) | $M_H$(lbs.) | $T_{S2}$(min.) | $T_c(10)$ (min.) | $T_c(90)$ (min.) |
| 1 | 5 | 29 | 2.4 | 2.8 | 17 |
| 2 | 5 | 24 | 5.0 | 5.2 | 16 |
| 3 | 5 | 32 | 1.8 | 2.2 | 12.2 |
| 4 | 5 | 35 | 2.4 | 2.8 | 16 |
| 5 | 4.5 | 30 | 2.0 | 2.2 | 11 |
| 6 | 4 | 28 | 2.2 | 2.4 | 13 |
| 7 | 4 | 25 | 5.0 | 5.4 | 15 |
| 8 | 4 | 25 | 10 | 11.3 | 54 |
| 9 | 5.3 | 30.0 | 4.0 | 6.3 | 67.5 |
| 10 | 4.8 | 28.0 | 3.7 | 5.0 | 42.0 |
| 11 | 5.5 | 33.0 | 1.6 | 2.1 | 10.1 |
| 12 | 4.0 | 27.5 | 1.8 | 2.2 | 7.0 |
| 13 | 4.0 | 31.0 | 3.9 | 4.4 | 12.8 |
| 14 | — | — | — | — | 10 |
| 15 | — | — | — | — | 25 |
| 16 | — | — | — | — | 10 |
| 17 | — | — | — | — | 8 |

TABLE III

| Example No. | Static Properties | | | | | |
|---|---|---|---|---|---|---|
| | $E_u$(%) | $T_u$(psi) | $T_{400}$(psi) | $T_{300}$(psi) | $T_{200}$(psi) | $T_{100}$(psi) |
| 1 | 569 | 2126 | 1522 | 1316 | 1119 | 718 |
| 2 | 606 | 1803 | 1223 | 1058 | 919 | 557 |
| 3 | 437 | 2071 | 1910 | 1558 | 1257 | 801 |
| 4 | 470 | 2038 | 1685 | 1337 | 1076 | 701 |
| 5 | 503 | 2118 | 1666 | 1325 | 1049 | 691 |
| 6 | 593 | 2460 | 1007 | 726 | 543 | 381 |
| 7 | 667 | 2340 | 748 | 572 | 453 | 334 |
| 8 | 838 | 2125 | 551 | 472 | 400 | 311 |
| 9 | 561 | 1875 | 1504 | 1310 | 1081 | 610 |
| 10 | 720 | 2129 | 1139 | 1012 | 875 | 527 |
| 11 | 571 | 2677 | 1544 | 1205 | 968 | 632 |
| 12 | 600 | 2340 | 985 | 705 | 510 | 340 |
| 13 | 655 | 2271 | 778 | 598 | 474 | 350 |
| 14 | 625 | 3068 | — | 995 | 753 | 538 |
| 15 | 720 | 2761 | — | 1191 | 1023 | 661 |
| 16 | 560 | 2918 | — | 1813 | 1464 | 953 |

TABLE III-continued

| Example No. | Static Properties | | | | | |
|---|---|---|---|---|---|---|
| | $E_u(\%)$ | $T_u$(psi) | $T_{400}$(psi) | $T_{300}$(psi) | $T_{200}$(psi) | $T_{100}$(psi) |
| 17 | 537 | 3096 | — | 1822 | 1458 | 969 |

TABLE IV

| Example No. | Dynamic Properties | | |
|---|---|---|---|
| | M'(psi) | M''(psi) | Tan Delta |
| 1 | 1103 | 177 | 0.160 |
| 2 | 1083 | 184 | 0.170 |
| 3 | 1168 | 191 | 0.163 |
| 4 | 1113 | 194 | 0.174 |
| 5 | 974 | 172 | 0.177 |
| 6 | 1078 | 211 | 0.196 |
| 7 | 1319 | 283 | 0.214 |
| 8 | 1150 | 228 | 0.198 |
| 9 | 890 | 159 | 0.179 |
| 10 | 1078 | 195 | 0.181 |
| 11 | — | — | 0.166 |
| 12 | 1006 | 216 | 0.215 |
| 13 | 1011 | 193 | 0.191 |
| 14 | — | — | — |
| 15 | — | — | — |
| 16 | — | — | — |
| 17 | — | — | — |

TABLE V

| Example No. | Tear Resistance Die C (ppi) | Shore A Hardness | Rebound D (%) | Comp. Set (%) | Flex Fatigue (Cycles ÷ 100) |
|---|---|---|---|---|---|
| 1 | 219 | 62 | 54 | 57 | 935 |
| 2 | 253 | 63 | 51 | 56 | 1232 |
| 3 | 267 | 63 | 53 | 76 | 423 |
| 4 | 223 | 62 | 53 | 69 | 391 |
| 5 | 233 | 60 | 53 | 72 | 565 |
| 6 | 189 | 61 | 51 | 80 | 209 |
| 7 | 188 | 65 | 51 | 83 | 977 |
| 8 | 196 | 60 | 44 | — | 764 |
| 9 | 221 | 63 | 47 | — | 545 |
| 10 | 233 | 61 | 45 | — | 619 |
| 11 | 265 | 63 | 47 | — | 466 |
| 12 | 170 | 59 | 44 | — | 222 |
| 13 | 197 | 60 | 46 | — | 304 |
| 14 | 199 | 68 | 44 | — | — |
| 15 | 250 | 65 | 47 | — | — |
| 16 | 156 | 65 | 50 | — | — |
| 17 | 220 | 67 | 48 | — | — |

Figure 1:
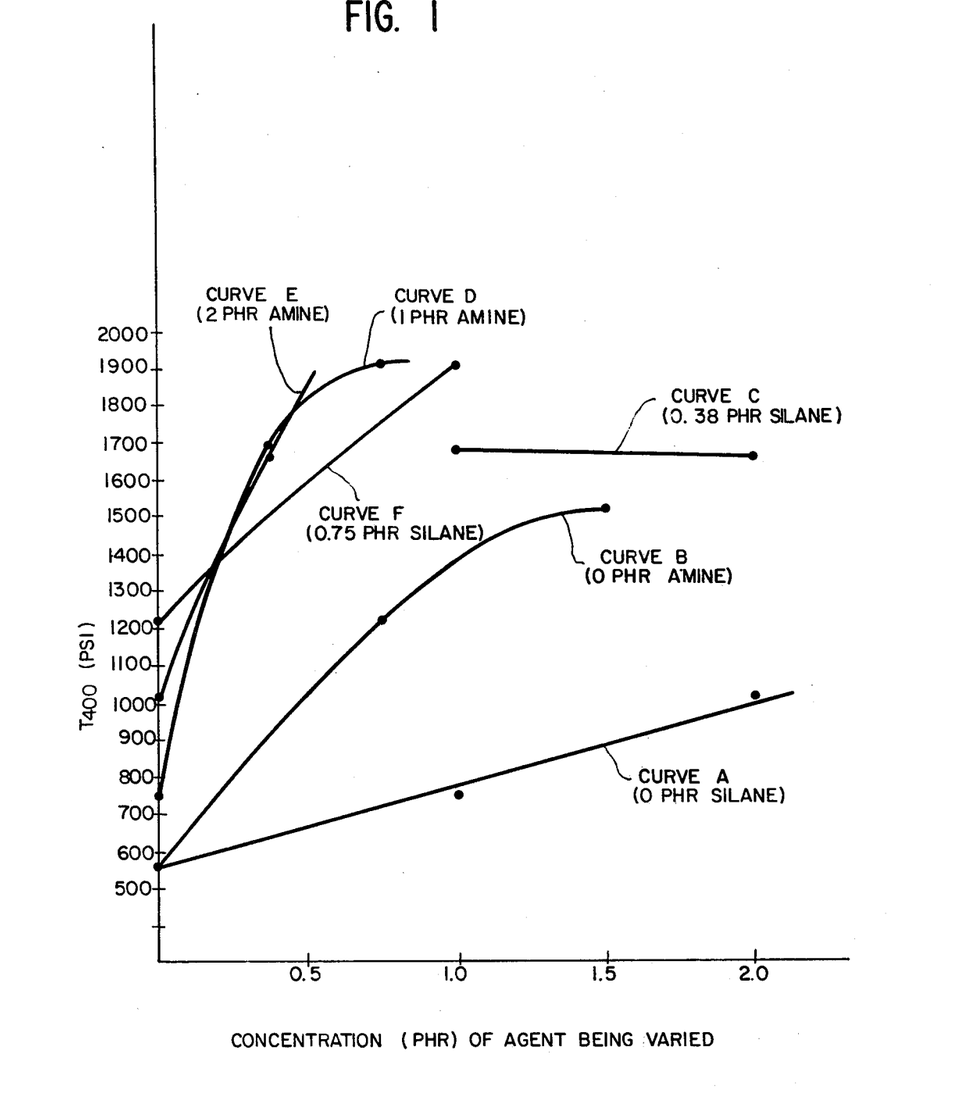
FIG. 1 is a series of plots illustrating the variation of the tensile strength of a rubber composition at 400 percent elongation as a function of the concentrations of 3-aminopropyltriethoxysilane and N,N,N',N'-tetra-(2-hydroxypropyl)-ethylenediamine in one set of embodiments of the composition of this invention.

The values of $T_{400}$ for Examples 1–8 are plotted in FIG. 1 as a function of the concentration of one of the silane or amine while the concentration of the other of the silane or amine is held constant. The values of $T_{400}$ for Examples 8–13 are plotted in FIG. 2 also as a function of the concentration of one of the silane or amine while the concentration of the other of the silane or amine is held constant. The concentration of the agent which is held constant is indicated for each curve in FIGS. 1 and 2. For example, in Curve B in FIG. 1, with no amine present in the rubber composition, the value of $T_{400}$ increased from 551 to 1223 to 1522 as the concentration of the silane increased from 0 phr to 0.75 phr to 1.5 phr, respectively. Similarly, in Curve D in FIG. 1, with the amine present at a constant level of 1 phr, the value of $T_{400}$ increased from 748 to 1685 to 1910 as the concentration of the silane increased from 0 phr to 0.38 phr to 0.75 phr, respectively. Similar plots are shown in FIG. 2.

Figure 2:
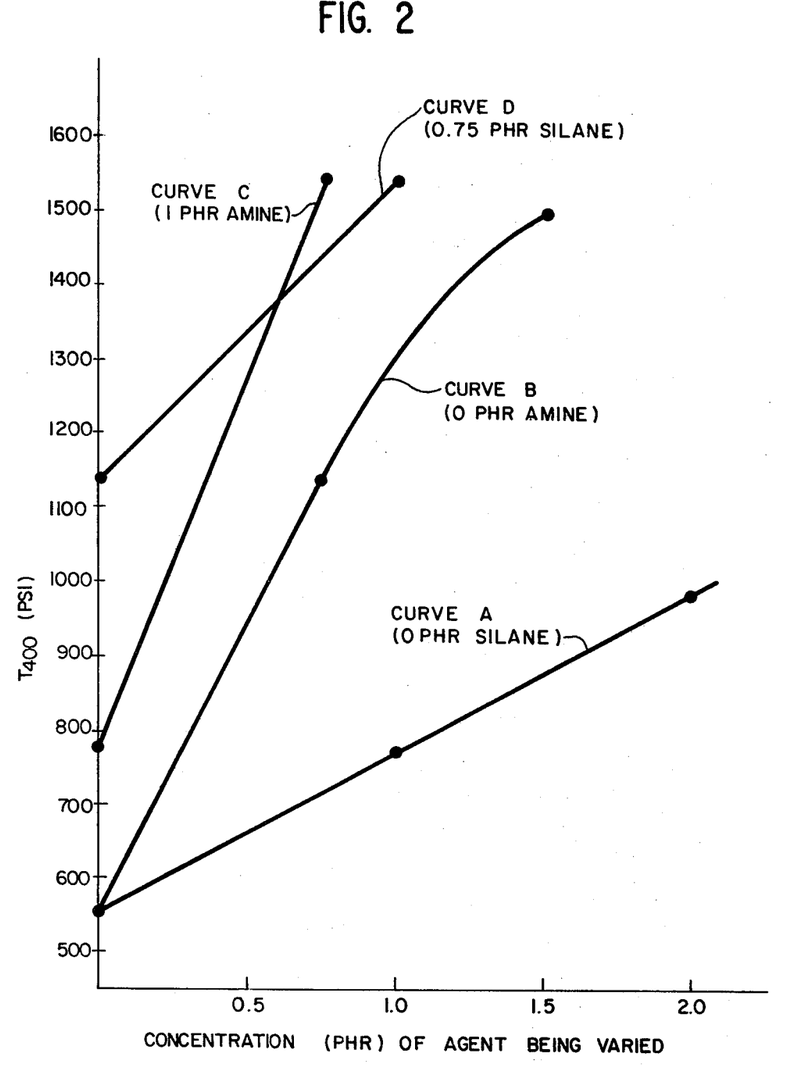
FIG. 2 is a series of plots illustrating the variation of the tensile strength of a rubber composition at 400 percent elongation as a function of the concentrations of 3-mercaptopropyltrimethoxysilane and triethanolamine in another set of embodiments of this invention.

The curves in FIGS. 1 and 2 illustrate that the beneficial effect on the value of $T_{400}$ of increases in the concentration of the amine from 0 phr to 1 phr is greater if the silane is also present in the rubber composition. Similarly these curves also illustrate that the beneficial effect on the value of $T_{400}$ of increases in the concentration of the silane from 0 phr to 0.75 phr is greater if the amine is also present in the rubber composition. Furthermore, as clearly indicated in both FIGS. 1 and 2, when both the silane at a first concentration and the amine at a second concentration are present together in the rubber composition, the change in the value of $T_{400}$ is greater than the sum of the change in the value of $T_{400}$ effected by the silane alone at the first concentration plus the change in the value of $T_{400}$ effected by the amine alone at the second concentration. In all cases, the change in the value of $T_{400}$ is measured from its value when the silane and amine are each at a concentration of 0 phr.

It must of course be recognized that each silane of formula I is not equally effective as a coupling agent and that each amine of formula II is not equally effective as a coupling agent. Similarly each combination of a silane of formula I and an amine of formula II does not afford a synergistic improvement in tensile strength to an equal degree. For example, triethanolamine has only 1 nitrogen atom and is consequently incapable of forming chelates with a metal ion in the mineral of equal stability as those formed by N,N,N',N'-tetra-(2-hydroxypropyl)-ethylenediamine. Consequently, combinations of a silane with triethanolamine do not afford a synergistic improvement in the tensile strength to the same extent as do combinations of the same silane with N,N,N',N'-tetra-(2-hydroxypropyl)-ethylenediamine. For this reason, the synergistic effect of the additives in Examples 3–5 in which N,N,N',N'-tetra-(2-hydroxypropyl)ethylenediamine was employed was pronounced for each of $T_{300}$, $T_{200}$ and $T_{100}$ as well as for $T_{400}$. On the contrary, the synergistic effect of the additives in Example 11 was less pronounced, and decreased from $T_{400}$ to $T_{300}$ and to $T_{200}$ and $T_{100}$. Thus, amines of formula II for which Z is not 0 and $R_5$ is ethylene are preferred in the rubber composition of this invention.

Additional evidence of synergism is found from a comparison of the values of $T_{100}$, $T_{200}$ and $T_{300}$ in Examples 8 and 14–17. These results indicate that the increase in each of $T_{100}$, $T_{200}$ and $T_{300}$ (measured from the values therefor when neither the amine nor silane are present) is greater in Example 17 (where the silane and amine are present together at levels of 0.75 phr and 3 phr, respectively) and in Example 16 (where the silane and amine are present together at levels of 0.75 phr and 1 phr, respectively) than the sum of the increase in each of $T_{100}$, $T_{200}$ and $T_{300}$ in Example 14 (where the amine is present at a level of 3 phr but no silane is present) plus the increase in each of $T_{100}$, $T_{200}$ and $T_{300}$, respectively, in Example 15 (where the silane is present at a level of 0.75 phr but no amine is present).

Figure 3:
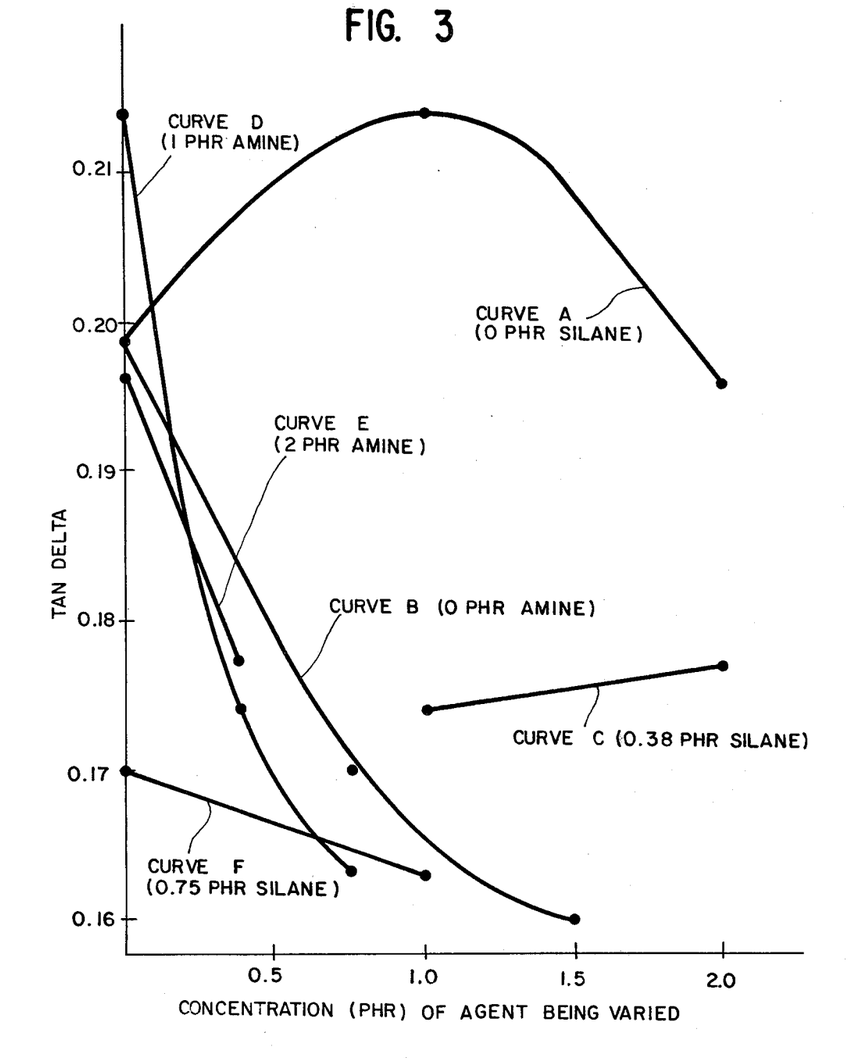
FIG. 3 is a series of plots illustrating the variation of Tan Delta as a function of the concentrations of 3-aminopropyltriethoxysilane and N,N,N',N'-tetra-(2-hydroxypropyl)-ethylenediamine in the same set of embodiments of the invention to which FIG. 1 pertains.

The values of Tan Delta for Examples 1–8 are plotted in FIG. 3 as a function of the concentration of one of the silane or amine while the other of the silane or amine is held constant. The concentration of the agent which is held constant is indicated for each curve in FIGS. 3 and 4. The values of Tan Delta for Examples 8–13 are plotted in FIG. 3 also as a function of the concentration of one of the silane or amine while the concentration of the other of the silane or amine is held constant. For example, in Curve B in FIG. 3, with no amine present in the rubber composition, the value of Tan Delta decreased from 0.198 to 0.170 to 0.160 as the concentration of the silane increased from 0 phr to 0.75 phr to 1.5 phr, respectively. Similarly, in Curve D in FIG. 3, with the amine present at a constant level of 1 phr, the value of Tan Delta decreased from 0.214 to 0.174 to 0.163 as the concentration of the silane increased from 0 phr to 0.38 phr to 0.75 phr, respectively.

Generally it is desired to maximize $M'$ and minimize $M''$ and hence to minimize Tan Delta. The data plotted in FIG. 3 illustrate the synergistic improvement in Tan Delta as a result of the use of the organosilane and amine together in the composition of this invention. The basis for the synergism illustrated by the data in FIG. 3 is that, as indicated by Curve A, the addition of the amine at levels up to 1 phr results in an increase—that is, worsening—of the value of Tan Delta. By contrast, as indicated by reference to Curves D–F the negative effect of the addition of the amine is converted to a positive effect when the organosilane is also present in the rubber composition of this invention. For example, reference to Curve F indicates that when the organosilane is present at a level of 0.75 phr, the addition of 1 phr of the amine unexpectedly results in a further improvement or decrease in the value of Tan Delta, instead of worsening the value of Tan Delta as illustrated by Curve A. Furthermore, reference to Curves D and E indicates that the beneficial effects on the value of Tan Delta stemming from the addition of the organosilane is further enhanced by the presence of one or two phr of the amine. In conclusion, although interpretation of the data illustrated in FIG. 3 is complicated by the negative effect on the value of Tan Delta as a result of the addition of at least up to 1 phr of the amine in the absence of the organosilane, once this difficulty is taken into consideration it is readily evident that the positive effect on the value of Tan Delta resulting from the addition of both the amine and the organosilane is greater than the sum of the positive effect on the value of Tan Delta resulting from the addition of the organosilane alone plus the negative effect on the value of Tan Delta resulting from the addition of the amine alone.

Figure 4:
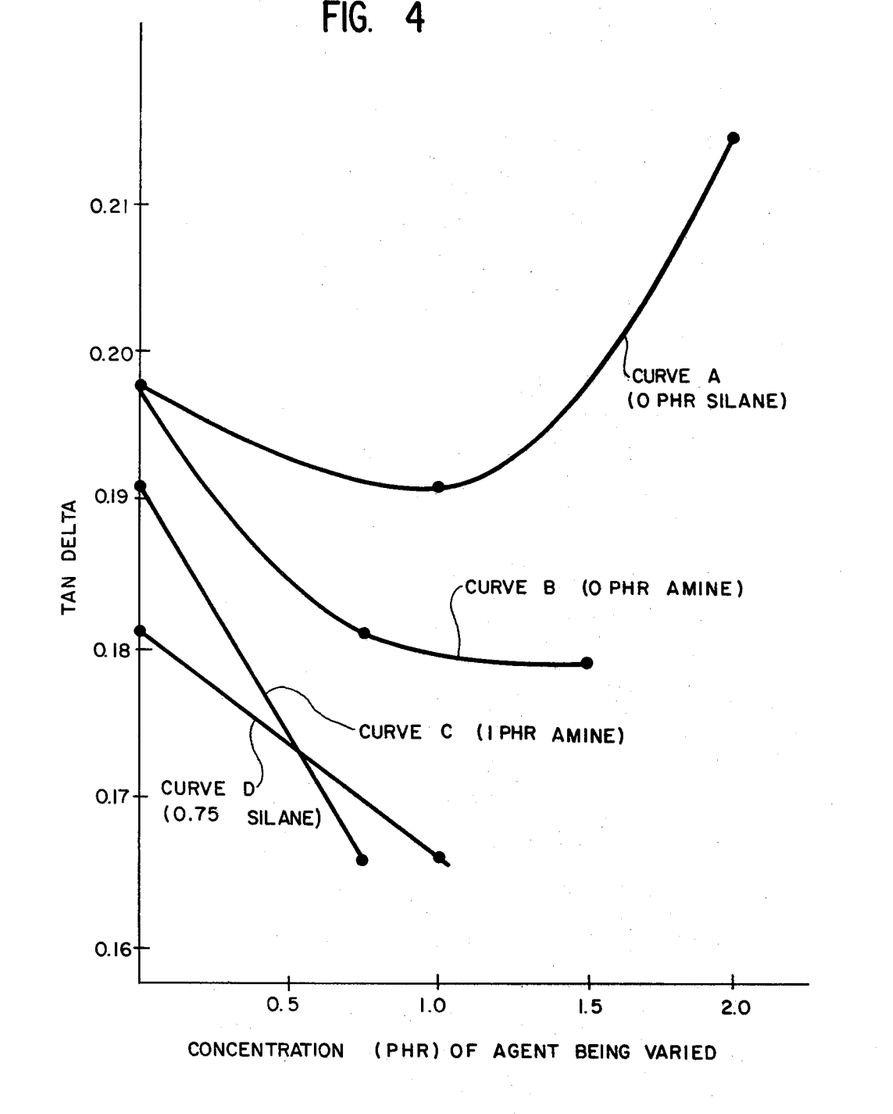
FIG. 4 is a series of plots illustrating the variation of Tan Delta as a function of the concentrations of 3-mercaptopropyltrimethoxysilane and triethanolamine in the same set of embodiments to which FIG. 2 pertains.

In FIG. 4, the negative effect on the value of Tan Delta as a result of an increase in the concentration of the amine does not occur until the amine concentration exceeds 1 phr. As the result the synergistic improvement in Tan Delta resulting from the presence of both the silane of formula I and the amine of formula II is very readily apparent in FIG. 4. The improvement in Tan Delta as a result of the addition of either the amine or the silane is greater in the presence of the other of the amine or the silane than in its absence. Furthermore, the improvement in Tan Delta as a result of the addition of both a given amount of the amine and a given amount of the silane is greater than the sum of the improvement due to the addition of the same given amount of the amine and the improvement due to the addition of the same given amount of the silane.

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

Having described the invention, what is claimed is:

1. A rubber composition formed according to an improved rubber compounding process, wherein the improvement comprises vulcanizing natural rubber, polybutadiene rubber, polyisoprene rubber, or styrene-butadiene rubber containing a substantially uniform dispersion of:
 A. 1. particulate Agent E at a level of from about 5 to about 200 phr,
  2. Agent F at a level of from about 0.005 to about 15 phr, and
  3. Agent G at a level of from about 0.005 to about 15 phr; or
 B. 1. a particulate adduct of Agents E and F having a median particle size in the range of from about 0.01 to about 20 microns and present at a level such that the portion thereof contributed from Agent E is at a level of from about 5 to about 200 phr and the portion thereof contributed from Agent F is at a level of from about 0.005 to about 15 phr, and
  2. Agent G at a level of from about 0.005 to about 15 phr; or
 C. 1. a particulate adduct of Agents E and G having a median particle size in the range of from about 0.01 to about 20 microns and present at a level such that the portion thereof contributed from Agent E is at a level of from about 5 to about 200 phr and the portion thereof contributed from Agent G is at a level of from about 0.005 to about 15 phr, and
  2. Agent F at a level of from about 0.005 to about 15 phr; or
 D. a particulate adduct of Agents E, F, and G having a median particle size in the range of from about 0.01 to about 20 and present at a level such that the portion thereof contributed from Agent E is at a level of from about 5 to about 200 phr, the portion thereof contributed from Agent F is at a level of from about 0.005 to about 15 phr and the portion thereof contributed from Agent G is at a level of from about 0.005 to about 15 phr;
wherein Agent E comprises phyllosilicate mineral particles having a median particle size in the range of from about 0.01 to about 20 microns;
wherein Agent F comprises an organosilane of formula I wherein X is a group which is, or which upon hydrolysis forms a group which is, capable of reacting with a reactive site on the phyllosilicate mineral particles so as to form a bond between the organosilane of formula I and the phyllosilicate mineral particles,
wherein Y is an alkyl, aryl or alkyl-substituted aryl group containing from 1 to 20 carbon atoms and bears a functional group capable of reacting with a reactive site on the rubber so as to form a bond between the organosilane of formula I and the rubber, and
wherein $R_1$ and $R_2$ are the same or different and are each selected from the group consisting of the groups described by X and Y, an alkyl group containing from 1 to 20 carbon atoms, an aryl group, and an alkyl-substituted aryl group wherein the alkyl substituents contain a total of from 1 to 20 carbon atoms; and
wherein Agent G comprises an amine of formula II wherein Z is zero or a positive integer from 1 to 12,
wherein $R_3$, $R_4$, $R_6$ and $R_7$ are the same or different and are each selected from the group consisting of hydrogen, an alkyl group containing from 1 to 20 carbon atoms, an aryl group and an alkyl-substituted aryl group wherein the alkyl substituents contain a total of from 1 to 20 carbon atoms,
wherein $R_5$ is an alkylene group containing from 2 to 16 carbon atoms,
wherein, when Z is zero, at least one of $R_3$, $R_4$ and $R_7$ bears a first functional group which is selected from the group consisting of a mercapto group, allyl group, vinyl group, epoxy group, methacryloxy group, acryloxy group, hydroxy group, and a group hydrolyzable to a hydroxy group, and at least one of $R_3$, $R_4$ and $R_7$ bears a second functional group which is, or which upon hydrolysis forms a group which is selected from the group consisting of a hydroxy group, an alkoxy group, a mercapto group, and a sulfide group and which second functional group is located at a carbon atom which is beta or gamma to the nearest tertiary nitrogen atom in formula II, and
wherein, when Z is not zero, at least one of $R_3$, $R_4$, $R_6$ and $R_7$ bears a first functional group which is selected from the group consisting of a mercapto group, allyl group, vinyl group, epoxy group, methacryloxy group, acryloxy group, hydroxy group, a group hydrolyzable to a hydroxy group, and, in addition, when $R_5$ contains more than 3 carbon atoms, at least one of $R_3$, $R_4$, $R_6$ and $R_7$ bears a second functional group which is, or which upon hydrolysis forms a group which is, selected from the group consisting of a hydroxy group, an alkoxy group, a mercapto group, and a sulfide group and which second functional group is attached to a carbon atom which is beta or gamma to the nearest tertiary nitrogen atom in formula II.

2. The rubber composition of claim 1 wherein a sulfur or sulfur-donating curing agent is employed.

3. The rubber composition of claim 1 wherein the phyllosilicate mineral is selected from the group consisting of a member of the kaolin group, a member of the mica group, a member of the group characterized by a primitive three-layer structure, a member of the group characterized by an expandable three-layer structure and a member of the group characterized by a four-layer structure.

4. The method of claim 3 wherein the phyllosilicate mineral is selected from the group consisting of kaolinite, muscovite, pyrophyllite, talc, vermiculite and chlorite.

5. The rubber composition of claim 4 wherein the phyllosilicate mineral is talc.

6. The rubber composition of claim 1 wherein X is a group which upon hydrolysis forms a hydroxyl group.

7. The rubber composition of claim 1 wherein X is selected from the group consisting of a halogen radical and —$OR_8$ and wherein $R_8$ is an alkyl group containing from 1 to 20 carbon atoms.

8. The rubber composition of claim 7 wherein X is —$OR_8$ and $R_8$ contains from 1 to 7 carbon atoms.

9. The rubber composition of claim 1 wherein the functional group on Y which is capable of reacting with a reactive site on the rubber is selected from the group consisting of a mercapto group, allyl group, vinyl group, epoxy group, methacryloxy group, acryloxy group, and an amino group having an active hydrogen atom.

10. The rubber composition of claim 9 wherein the functional group on Y which is capable of reacting with a reactive site on the rubber is selected from the group consisting of a mercapto group, a vinyl group and an amino group having an active hydrogen atom.

11. The rubber composition of claim 10 wherein Y contains from 1 to 6 carbon atoms.

12. The rubber composition of claim 1 wherein $R_1$ and $R_2$ are the same or different and are each selected from the group consisting of the group described by X.

13. The rubber composition of claim 12 wherein $R_1$ and $R_2$ are the same or different and are each selected from the group consisting of a halogen radical and —$OR_8$ and wherein $R_8$ is an alkyl group containing from 1 to 20 carbon atoms.

14. The rubber composition of claim 13 wherein X, $R_1$ and $R_2$ are the same.

15. The rubber composition of claim 1 wherein the organosilane of formula I is selected from the group consisting of 3-aminopropyl-triethoxysilane, 3-mercaptopropyl-trimethoxysilane and vinyl-tri-(2-methoxyethoxy) silane.

16. The rubber composition of claim 1 wherein the alkoxy group is —$OR_8$ wherein $R_8$ is an alkyl group containing from 1 to 20 carbon atoms.

17. The rubber composition of claim 1 wherein, when Z is not zero, at least one of $R_3$, $R_4$, $R_6$ and $R_7$ bears said second functional group.

18. The rubber composition of claim 1 wherein Z in formula II is 0 or 1.

19. The rubber composition of claim 1 wherein $R_5$ contains 2 or 3 carbon atoms.

20. The rubber composition of claim 1 wherein the amine of formula II is triethanolamine and N,N,N',N'-tetra-(2-hydroxypropyl) ethylenediamine.

21. The rubber composition of claim 1 wherein the median particle size of Agent E and of the adducts is in the range of from about 0.1 to about 1 micron.

22. The rubber composition of claim 1 wherein Agent E and the portions of the adducts contributed from Agent E are each at a level of from about 50 to about 150 phr.

23. The rubber composition of claim 1 wherein Agent F and the portions of the adducts contributed from Agent F are each at a level of from about 0.25 to about 3 phr.

24. The rubber composition of claim 1 wherein Agent G and the portions of the adducts contributed from Agent G are each at a level of from about 0.25 to about 3 phr.

25. A rubber composition comprising phyllosilicate mineral particles substantially uniformly distributed in natural rubber, polybutadiene rubber, polyisoprene rubber or styrene-butadiene rubber at a level of from about 5 to about 200 phr and having a median particle size of from about 0.01 to about 20 microns, and (1) an Adduct A of the rubber and phyllosilicate mineral particles with an organosilane of formula I wherein X is a group which is, or which upon hydrolysis forms a group which is, capable of reacting with a reactive site on the phyllosilicate mineral particles so as to form a bond between the organosilane of formula I and the phyllosilicate mineral particles, wherein Y is an alkyl, aryl or alkyl-substituted aryl group containing from 1 to 20 carbon atoms and bears a functional group capable of reacting with a reactive site on the rubber so as to form a bond between the organosilane of formula I and the rubber, and wherein $R_1$ and $R_2$ are the same or different and are each selected from the group consisting of the groups described by X and Y, an alkyl group containing from 1 to 20 carbon atoms, an aryl group, and an alkyl-substituted aryl group wherein the alkyl substituents contain a total of from 1 to 20 carbon atoms, the portion of Adduct A contributed from the organosilane of formula I being at a level of from about 0.005 to about 15 phr; and (2) an Adduct B of the rubber and phyllosilicate mineral particles with an amine of formula II wherein Z is zero or a positive integer from 1 to 12, wherein $R_3$, $R_4$, $R_6$ and $R_7$ are the same or different and are each selected from the group consisting of hydrogen, an alkyl group containing from 1 to 20 carbon atoms, an aryl group and an alkyl-substituted aryl group wherein the aryl substituents contain a total of from 1 to 20 carbon atoms, wherein $R_5$ is an alkylene group containing from 2 to 16 carbon atoms, wherein, when Z is zero, at least one of $R_3$, $R_4$ and $R_7$ bears a first functional group which is selected from the group consisting of a mercapto group, allyl group, vinyl group, epoxy group, methacryloxy group, acryloxy group, hydroxy group, and a group hydrolyzable to a hydroxy group, and at least one of $R_3$, $R_4$ and $R_7$ bears a second functional group which is, or which upon hydrolysis forms a group which is, selected from the group consisting of a hydroxy group, an alkoxy group, a mercapto group, and a sulfide group and which second functional group is located at a carbon atom which is beta or gamma to the nearest tertiary nitrogen atom in formula II, and wherein, when Z is not zero, at least one of $R_3$, $R_4$, $R_6$ and $R_7$ bears a first functional group which is selected from the group consisting of a mercapto group, allyl group, vinyl group, epoxy group, methacryloxy group, acryloxy group, hydroxy group, and a group hydrolyzable to a hydroxy group, and, in addition, when $R_5$ contains more than 3 carbon atoms, at least one of $R_3$, $R_4$, $R_6$ and $R_7$ bears a second functional group which is, or which upon hydrolysis forms a group which is, selected from the group consisting of a hydroxy group, an alkoxy group, a mercapto group, and a sulfide group and which second functional group is attached to a carbon atom which is beta or gamma to the nearest tertiary nitrogen atom in formula II, and the portion of Adduct B contributed from the amine of formula II being at a level of from about 0.005 to about 15 phr.

26. The rubber composition of claim 25 formed by a vulcanization process employing a sulfur or sulfur-donating curing agent.

27. The rubber composition of claim 25 wherein the phyllosilicate mineral is selected from the group consisting of a member of the kaolin group, a member of the mica group, a member of the group characterized by a primitive three-layer structure, a member of the group characterized by an expandable three-layer structure and a member of the group characterized by a four-layer structure.

28. The rubber composition of claim 27 wherein the phyllosilicate mineral is selected from the group consisting of kaolinite, muscovite, pyrophyllite, talc, vermiculite and chlorite.

29. The rubber composition of claim 28 wherein the phyllosilicate mineral is talc.

30. The rubber composition of claim 25 wherein X is a group which upon hydrolysis forms a hydroxyl group.

31. The rubber composition of claim 25 wherein X is selected from the group consisting of a halogen radical and —$OR_8$ and wherein $R_8$ is an alkyl group containing from 1 to 20 carbon atoms.

32. The rubber composition of claim 31 wherein X is —$OR_8$ and $R_8$ contains from 1 to 7 carbon atoms.

33. The rubber composition of claim 25 wherein the functional group on Y which is capable of reacting with a reactive site on the rubber is selected from the group consisting of a mercapto group, allyl group, vinyl group, epoxy group, methacryloxy group, acryloxy group and an amino group having an active hydrogen atom.

34. The rubber composition of claim 33 wherein the functional group on Y which is capable of reacting with a reactive site on the rubber is selected from the group consisting of mercapto, vinyl and an amino group having an active hydrogen atom.

35. The rubber composition of claim 34 wherein Y contains from 1 to 6 carbon atoms.

36. The rubber composition of claim 25 wherein $R_1$ and $R_2$ are the same or different and are each selected from the group consisting of the group described by X.

37. The rubber composition of claim 36 wherein $R_1$ and $R_2$ are the same or different and are each selected from the group consisting of a halogen radical and —$OR_8$ and wherein $R_8$ is an alkyl group containing from 1 to 20 carbon atoms.

38. The rubber composition of claim 37 wherein X, $R_1$ and $R_2$ are the same.

39. The rubber composition of claim 25 wherein the agent of formula I is 3-aminopropyl-triethoxysilane, 3-mercaptopropyl-trimethoxysilane, and vinyl-tri-(2-methoxyethoxy) silane.

40. The rubber composition of claim 25 wherein the alkoxy group is —$OR_8$ wherein $R_8$ is an alkyl group containing from 1 to 20 carbon atoms.

41. The rubber composition of claim 25 wherein, when Z is not zero, at least one of $R_3$, $R_4$, $R_6$ and $R_7$ bears said second functional group.

42. The rubber composition of claim 25 wherein Z in formula II is 0 or 1.

43. The rubber composition of claim 25 wherein $R_5$ contains from 2 or 3 carbon atoms.

44. The rubber composition of claim 25 wherein the amine of formula II is triethanolamine and N,N,N',N'-tetra-(2-hydroxypropyl) ethylenediamine.

45. The rubber composition of claim 25 wherein the phyllosilicate mineral median particle size is in the range of from about 0.1 to about 1 micron.

46. The rubber composition of claim 25 wherein the phyllosilicate mineral particles are at a level of from about 50 to about 150 phr.

47. The rubber composition of claim 25 wherein the portion of Adduct A contributed from the organosilane of formula I is at a level of from about 0.25 to about 3 phr.

48. The rubber composition of claim 25 wherein the portion of Adduct B contributed from the amine of formula II is at a level of from about 0.25 to about 3 phr.

* * * * *

UNITED STATES PATENT OFFICE
CERTIFICATE OF CORRECTION

Patent No. 4,400,485            Dated August 23, 1983

Inventor(s) MUKAMAL, HAROLD; LAMAR, RICHARD S. AND FERREIRA, LAURENCE E.

It is certified that error appears in the above-identified patent and that said Letters Patent are hereby corrected as shown below:

| Col. | Line | |
|---|---|---|
| 1 | 51 | "develop with highest" should read ---develop the highest--- |
| 19 | 45 | "the aryl substituents" should read ---the alkyl substituents--- |

Signed and Sealed this

Thirty-first Day of January 1984

[SEAL]

Attest:

Attesting Officer

GERALD J. MOSSINGHOFF

Commissioner of Patents and Trademarks